UNITED STATES PATENT OFFICE.

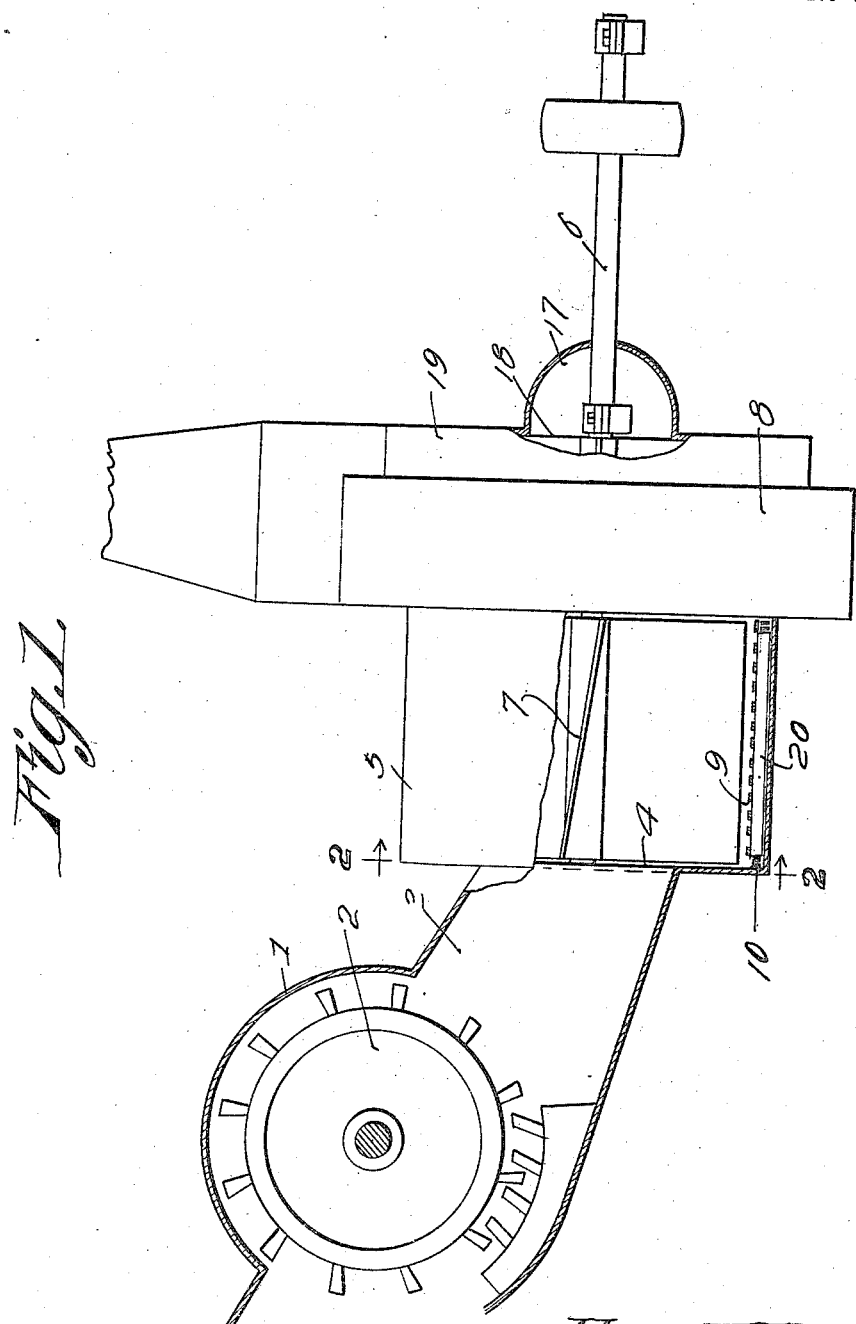

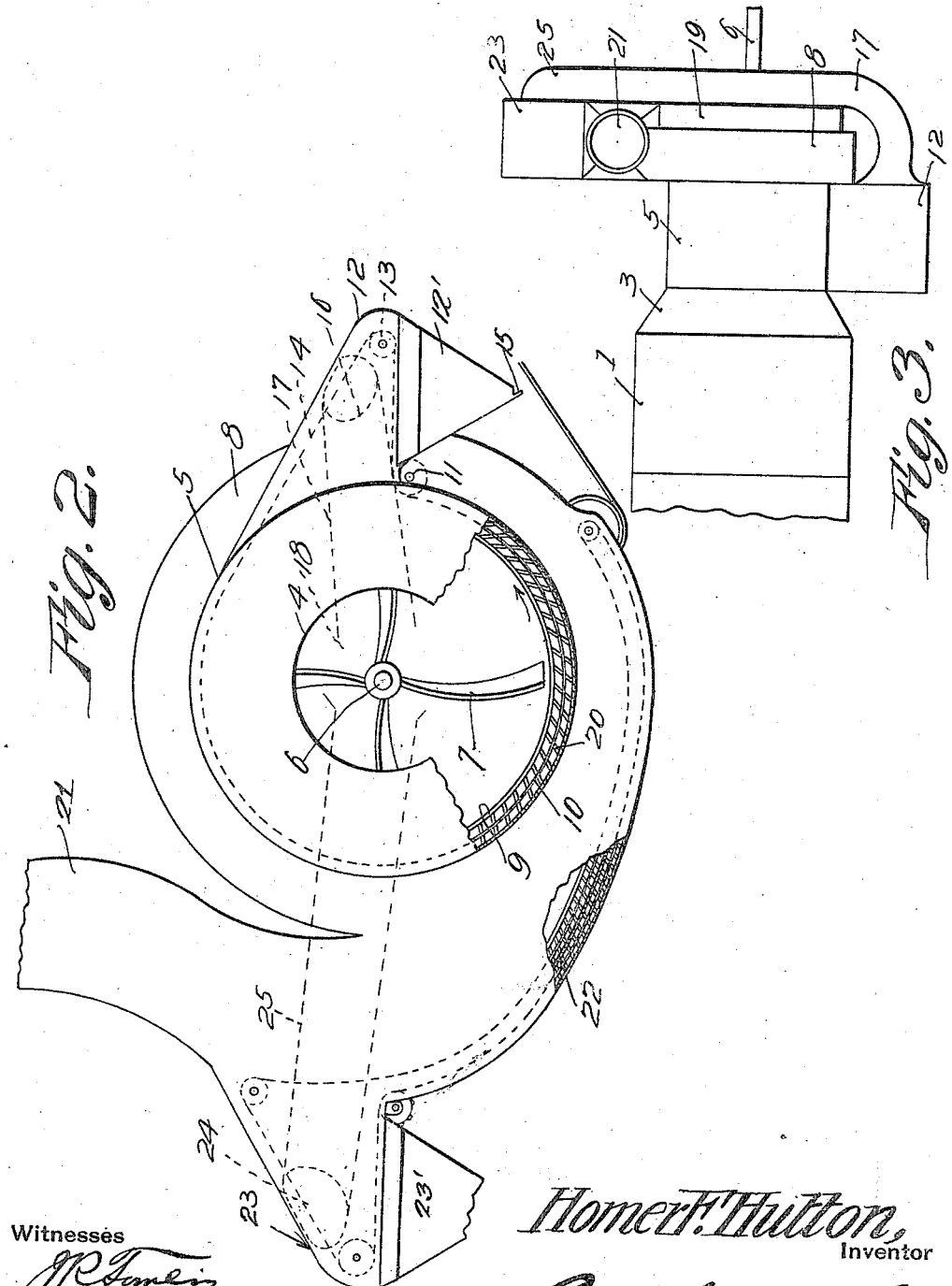

HOMER F. HUTTON, OF JEFFERS, MONTANA.

THRESHING-MACHINE.

1,234,168. Specification of Letters Patent. Patented July 24, 1917.

Application filed May 10, 1916. Serial No. 96,632.

*To all whom it may concern:*

Be it known that I, HOMER F. HUTTON, a citizen of the United States, residing at Jeffers, in the county of Madison and State of Montana, have invented a new and useful Threshing-Machine, of which the following is a specification.

The present invention relates to improvements in threshing machines, one object of the present invention being the provision of a rotary separator means disposed between the threshing cylinder and the stacker fan, whereby the grain is properly separated from the straw and chaff in transit, and whereby the usual shaking mechanism employed and interposed between the thresher cylinder and stacker fan is dispensed with.

A further object of the present invention is the provision of a threshing machine, in which the mechanical parts are greatly reduced and in which the complete thresher is so constructed as to occupy a smaller space than is customary with the usual form of threshing machine in which the shaking mechanisms are interposed between the threshing cylinder and the stacker fan.

A still further object of the present invention is the provision of a threshing machine in which the rotary straw and grain conveyer mechanism is provided with a novel grain conveyer disposed to move in opposition to the blast from the fan, and in which the stacker fan casing is provided with a similar mechanism for removing the finally separated grain.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—

Figure 1 is a side elevation of the present threshing mechanism, the threshing cylinder and the straw feeding cylinder in the present instance being shown in section.

Fig. 2 is a view taken on line 2—2 of Fig. 1.

Fig. 3 is a top plan view of the threshing mechanism as shown in Fig. 1.

Referring to the drawings, the numeral 1 designates the thresher cylinder provided with the rotary threshing mechanism 2, the same being here shown diagrammatically and merely as indicative of any form of threshing mechanism. Leading from the cylinder 1 is the outlet 3, which leads into the opening 4 of the main casing 5 of the present mechanism. This casing 5 is preferably cylindrical and has mounted therein, the shaft 6 which carries the combined fan and conveying member 7, the blades of which are disposed on the spiral so as to properly receive the straw from the conduit 3 and force it to the right, as viewed in Fig. 1, into the main fan casing 8 of the stacker mechanism.

Disposed within the cylinder 5 and nearly the full circumference thereof, are the circumferential slats 9, which are spaced to permit of the passage of the separated grain due to the action of the fan both as to the air blast and the centrifugal force imparted to the straw and grain thereby, such slats having mounted therebelow the endless grain conveying mechanism 10, which passes over the idler pulley 11, as illustrated in Fig. 2, into the grain separating hopper or casing 12 around the drive pulley 13 and along the inclined upper wall 14 of the casing 12. This casing 12 is provided with the air outlet 16 and has a depending portion 12′ provided with a grain outlet 15.

A conduit 17 is led from the outlet 16 into the inlet 18 of the suction fan casing 19, the detail structure of which is immaterial and constitutes no part of the present invention.

It will thus be seen that the grain separated from the straw in transit to the cylinder, 5, will pass through the space between the slats 9 and be conveyed by the endless conveyer 10, which moves in the direction of the arrow as indicated in Fig. 2, thus along the bottom of the cylinder 5 into the hopper or casing 12, the same falling through the conveyer and finally out of the outlet 15 of the casing 12. Any chaff or fine particles of straw will be drawn through the conduit 17 into the suction chamber 19, and finally into the main stack 21 of the machine.

As before stated, the straw is delivered from the cylinder 5 into the main stacker or fan casing 8, and is there acted upon by the usual fan, the grain due to the action of the fan and the centrifugal force imparted by the fan being separated from the straw and delivered by the endless conveyer 22 into the auxiliary hopper 23 which is constructed similarly to the hopper 12 being provided with a depending outlet portion 23'. This hopper 23 is provided with the outlet 24 which leads into the conduit 25, said conduit 25 leading to the inlet 18 of the suction fan casing 19, so that the chaff and small particles that are carried with the grain to the hopper 23 will be drawn into the suction casing 19 and finally into the main stack 21. The main outlet of the fan casing 8 communicates with the main stack or conduit 21, so that the greater portion of the straw acted upon thereby will be delivered into such stack.

From the foregoing description, it is evident that with a construction of threshing mechanism as herein set forth, that the usual shaking members for separating the grain from the straw before the delivery thereof to the stacker is dispensed with, and that instead of the gravity feed of the straw into the stacker fan casing, the straw is fed by the spiral fan 7, so that the delivery thereof into the fan casing is absolutely assured, such fan being so constructed as to draw the straw through the conduit 3 and to, as before stated, compress it to a certain degree and deliver it into the main stacker fan casing 8.

It is also evident that with the peculiar combination and arrangement of conduits 17 and 25 and the auxiliary grain receiving hoppers 12 and 23, all grain that is carried into the cylinder 5 and casing 8 will be properly removed from the straw and collected.

What is claimed is:

1. A threshing machine, including a threshing cylinder, a straw receiving casing in communication therewith, a rotary straw conveyer and grain separator mounted in the casing, a blast fan casing in communication with the casing for receiving the straw therefrom, a shaft mounted in said casing, and connected to the rotary straw conveyer and grain separator, a fan mounted upon said shaft within the fan casing, a stacker conduit leading from the fan casing, an endless conveyer mounted in the fan casing for receiving the grain separated due to the blast from and the centrifugal action imparted by the fan, an auxiliary grain hopper into which the endless conveyer leads, a suction casing adjacent the fan casing and in communication with the auxiliary grain hopper, a fan mounted therein and connected to the shaft for creating a suction draft through the auxiliary grain casing to remove the chaff and finer particles from the grain, and a stack common to the suction and fan casing.

2. A threshing machine, including a threshing cylinder, a straw receiving casing in communication therewith, a rotary straw conveyer and grain separator mounted in the casing, a blast fan casing in communication with the casing for receiving the straw therefrom, a shaft mounted in said casing and connected to the rotary straw conveyer and grain separator, a fan mounted upon said shaft within the fan casing, a stacker conduit leading from the fan casing, an endless conveyer mounted in the fan casing for receiving the grain separated due to the blast from and the centrifugal action imparted by the fan, an auxiliary grain hopper into which the endless conveyer leads, a suction casing adjacent the fan casing and in communication with the auxiliary grain hopper, a fan mounted therein and connected to the shaft for creating a suction draft through the auxiliary grain casing to remove the chaff and finer particles from the grain, a stack common to the suction and fan casing, an endless grain conveyer mounted in the straw receiving casing for receiving the grain separated from the straw therein, a grain receiving hopper therefor, and a conduit leading from the latter to the suction chamber, whereby the suction fan creates a draft therethrough to remove the chaff and finer particles from the grain.

3. A threshing machine, including a threshing cylinder, a cylindrical casing in communication therewith, a pneumatic stacker fan casing in communication with the cylinder, a suction fan casing adjacent to the fan casing, a shaft disposed concentric of the cylinder, the fan casing and the suction fan casing, a conveyer and blast fan mounted upon the shaft within the cylinder to convey the straw from the threshing cylinder to the stacker fan casing, a fan mounted upon the shaft within the stacker fan casing, and a suction fan mounted upon the shaft within the suction fan casing, grain conveyer means mounted in the cylinder, auxiliary grain conveyer means mounted in the stacker fan casing, and two conduits, one leading from each of the latter means into the suction fan casing, whereby the chaff and finer particles are removed from the separated grain delivered from the cylinder and pneumatic stacker fan casing.

In testimony that I claim the foregoing as my own, I have hereto affixed my signature in the presence of two witnesses.

HOMER F. HUTTON.

Witnesses:
H. E. STEFFENS,
HUGH WAKEFIELD.